MODIFICATION C

United States Patent Office 3,015,655
Patented Jan. 2, 1962

3,015,655
SEPARATION OF NITROGENOUS ORGANIC
COMPOUNDS
John B. Stark, Berkeley, Calif., assignor to the United
States of America as represented by the Secretary of
Agriculture
Original application July 18, 1955, Ser. No. 522,885, now
Patent No. 2,891,945, dated June 23, 1959. Divided
and this application Jan. 6, 1959, Ser. No. 791,244
3 Claims. (Cl. 260—211.5)
(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the isolation of chemical substances from compositions containing them. In particular, the invention has for its prime object the separation of nitrogenous organic compounds such as purines, pyrimidines, nucleosides, and amino acids from other substances of an organic or inorganic nature. A specific object of the invention is the provision of processes whereby purines, pyrimidines, nucleosides and amino acids are separated from source materials containing such compounds in admixture with non-amino carboxylic acids, inorganic salts, sugars and other impurities of an inorganic or organic nature. Other objects of the invention concern the provision of processes for preparing the abovementioned types of nitrogenous compounds in their free base form from salts thereof. Other objects of the invention concern the provision of novel procedures for utilizing and regenerating ion exchange materials. Further objects and advantages of the invention will be evident from the description herein taken in connection with the annexed drawing.

Figure 1:
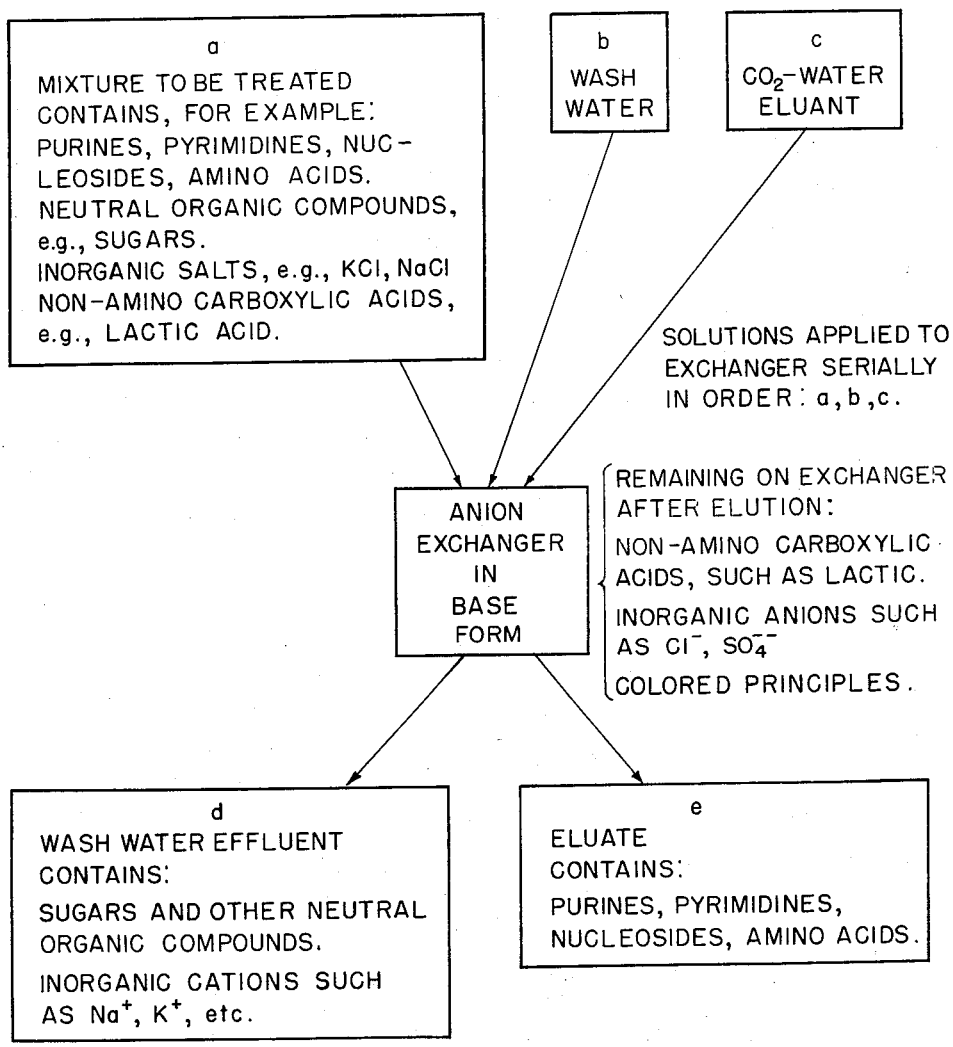
Figure 2:
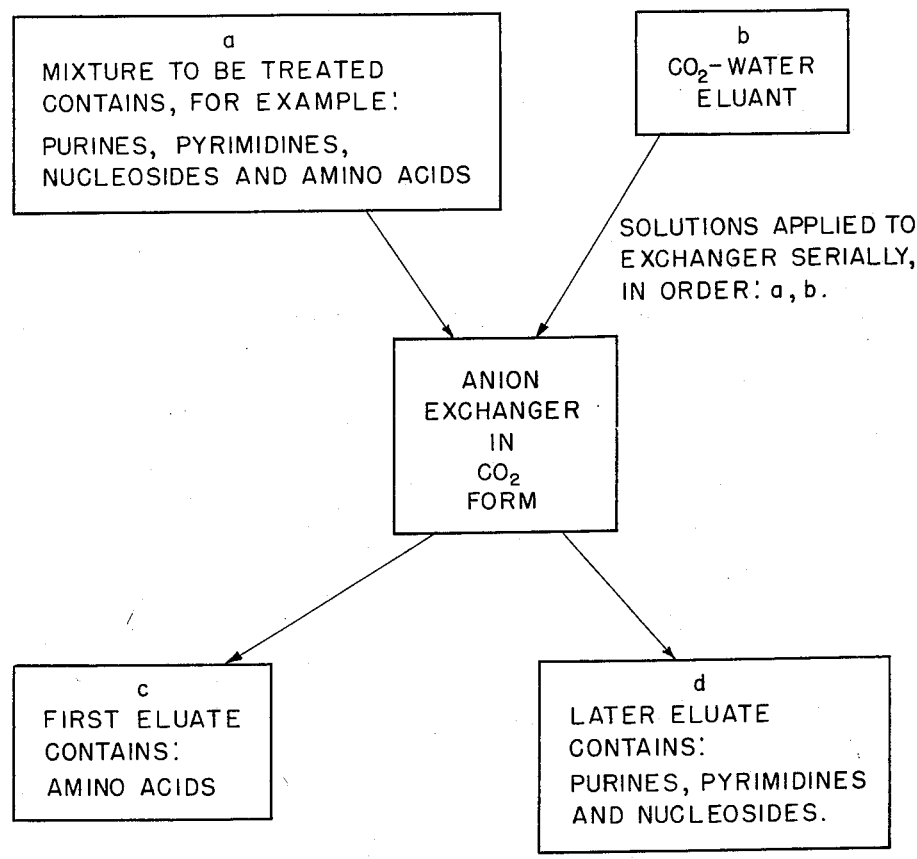
Figure 3:
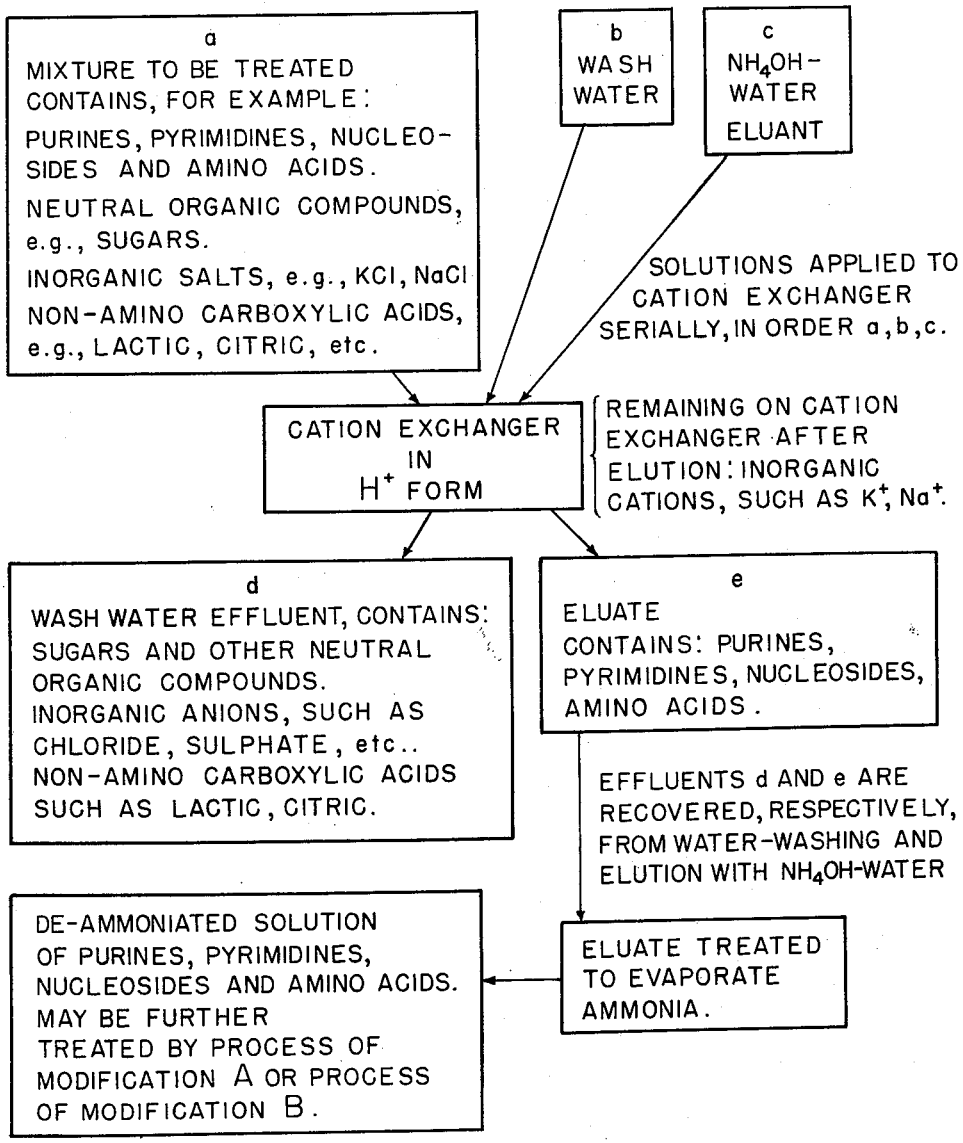

In the drawing: FIGS. 1, 2, and 3 are diagrammatic flow sheets illustrating the procedures of modifications A, B, and C, respectively, in accordance with this invention.

Chemical compounds of the classes of purines and pyrimidines, also known as purine bases and pyrimidine bases, occur in many biological materials, often combined with other substances to form nucleotides, nucleosides and nucleic acids. The purines and pyrimidines and their derivatives play essential roles in the life cycle of animals and plants. It is often desired to isolate these compounds from the biological substrates in which they occur for the purpose of conducting biochemical investigations. In general, the separation of purines and pyrimidines by known procedures is cumbersome and inefficient. Amino acids are likewise present in most plant and animal substances, particularly in combined form in proteinous materials. The separation of amino acids from biological materials especially from hydrolysates of proteinous materials is often desirable from the standpoint of conducting biochemical investigations or to obtain the amino acid for industrial purposes. Some of the amino acids such as glutamic acid, histidine, methionine, aspartic acid, lysine, etc. are used in the preparation of flavoring agents, as feed supplements, nutritive preparations, therapeutic agents; they are also useful as intermediates in chemical synthesis, and so forth. In general, known methods of separating amino acids from biological sources are difficult and inefficient.

It has now been found that substances such as purine bases, pyrimidine bases, nucleosides, and amino acids can be separated from mixtures containing them or from one another by relatively simple yet efficient processes. Basically, these processes involve novel techniques of ion exchange. The invention encompasses various modifications which are separately described hereinafter.

A basic feature of the invention involves a process wherein the mixture is contacted with an anion exchange material followed by elution of the exchanger with an aqueous solution of carbon dioxide. By such a treatment, an effective separation is achieved in that the eluate will contain for the most part the purines, pyrimidines, nucleosides, and amino acids originally present in the starting mixture. Remaining on the anion exchanger will be such compounds as non-amino carboxylic acids, inorganic acids, colored principles and so forth. Neutral organic compounds, such as sugars, and inorganic cations will not be adsorbed by the anion exchanger and will pass through the anion exchanger when the original mixture is contacted therewith. They also can be removed from the exchanger prior to elution by washing with water. The net result is summarized as follows:

(1) Present in the solution which passes through the anion exchanger or in the wash water: Sugars and other neutral organic compounds, inorganic cations such as $Na^+$, $K^+$, etc.

(2) Present in the $CO_2$-water eluate: Purines, pyrimidines, nucleosides, and amino acids.

(3) Remaining adsorbed on the anion exchange material after elution with $CO_2$-water: Non-amino carboxylic acids, inorganic anions such as chloride, sulphate, etc., colored principles, etc.

The above explanation illustrates the results that are generally achieved. However, in certain cases, depending on the chemical nature of the particular purines, pyrimidines, nucleosides, or amino acids, certain variations will occur. That is, some of these nitrogenous components will be contained in the fractions other than the $CO_2$-water eluate. These exceptions are discussed and explained hereinafter.

It is a feature of the invention that the nitrogenous compounds are eluted with a solution of carbon dioxide in water. As a result the eluate contains the desired nitrogenous compounds in aqueous solution. The carbon dioxide also present in the eluate can be readily removed by application of a moderate amount of heat leaving the desired compounds in solution. Consequently, the isolation of the nitrogenous compounds is not impeded by the presence of any undesired substance as would be the case if the eluting solution contained a non-volatile compound or one which was volatile only with the application of a high degree of temperature whereby the nitrogenous components would be exposed to the possibility of decomposition.

In one modification of the invention, the anion exchanger material is in the hydroxide form prior to application of the mixture. This procedure, in general, leads to separation of the purine bases, pyrimidine bases, nucleosides, and amino acids as a group from the associated impurities. This modification is explained in the part of this specification entitled "Modification A," and illustrated in FIG. 1 of the drawing.

In another modification, the basic process is varied in a certain way to achieve a different plan of fractionation. For example, if the anion exchanger is initially saturated with carbon dioxide, the mixture is applied to it and the exchanger is then eluted with water saturated with carbon dioxide, one can obtain a separation of amino acids from the other nitrogenous components (purines, pyrimidines, and nucleosides). In this modification, the amino acids will appear in the first runnings of the eluate whereas the other nitrogenous components will appear only in later runnings of the eluate. This plane of operation is explained at length below in the part of this specification entitled "Modification B" and illustrated in FIG. 2 of the drawing.

The plan of fractionation may also be varied by applying cation exchanger treatment to the mixture before or after either of the aforesaid treatments with the anion exchanger. This mode of operation is explained below in the part of this specification entitled "Modification C" and illustrated in FIG. 3 of the drawing.

Another modification involves applying a preliminary treatment to the original mixture, for example precipitation of the nitrogenous compounds as their salts with an inorganic acid. The resulting salts may then be subjected to the anion exchange treatment to effectuate a further separation and to produce the free bases. This procedure is explained in the part of the specification entitled "Modification D."

In operating under any of the modifications of the invention wherein elution with $CO_2$-water is involved, one may employ conditions to secure an eluting agent which contains more carbon dioxide than corresponds to saturation at room temperature and atmospheric pressures. To this end, the eluate may be a refrigerated solution of $CO_2$ in water, saturated at the refrigerated temperature. This temperature may be below room temperature and above the freezing point, for example, less than 20° C. and above 0° C. At such temperatures the eluting solution will contain more $CO_2$ and consequently have greater power for eluting the desired nitrogenous compounds. As a result less of the eluting solution need be used and the eluate will be a more concentrated solution of the desired nitrogenous compounds. Instead of using a refrigerated $CO_2$-water solution (or, in addition to using such refrigerated solution) one may conduct the elution under pressure. Thus the anion exchange material is held in a pressure-resistant vessel and a $CO_2$-water solution applied to it under superatmospheric pressure. Since the solubility of $CO_2$ increases with pressure, it is obvious that by this means less water is needed and the eluates contain the desired nitrogenous compounds in a more concentrated form. The degree of pressure is limited only by the pressure-resisting character of the equipment. In general, a range of pressure from 1 to 200 lbs. per sq. in. gauge pressure is practicable and easily attainable with conventional pumping systems.

The invention is of particular value in the isolation of purines, pyrimidines, nucleosides, and amino acids from biological source materials. The source material from which the nitrogenous compounds are isolated may be any one of extracts of plant or animal materials, hydrolysates of plant or animal tissue, and so forth. Examples of starting materials are liquids derived from such materials as animal pancreas, thymus, spleen, flesh, urine, guano, yeast, coffee, tea, cocoa, and so forth. Particularly useful are waste liquors such as those obtained in the preparation of cane and beet sugars.

Examples of classes of compounds or individual compounds which may be isolated in accordance with this invention are:

Purine bases: adenine, guanine, hypoxanthine, caffeine, theobromine, paraxanthine, theophylline, 2-aminouric acid, 2,6-diaminopurine, etc.

Pyrimidine bases: uracil, thymine, cytosine, divicine, 5-methyl cytosine, 2-amino-4-methyl pyrimidine, orotic acid, 6-methyluracil, 6-aminouracil, 4,6-dihydroxypyrimidine, 5-aminouracil, etc.

Nucleosides: uridine, thymidine, adenosine, xanthosine, inosine, guanosine, cytidine, orotidine, 5-methyl cytidine, etc.

Amino acids: glycine, alanine, valine, leucine, phenyl alanine, tyrosine, tryptophane, lysine, arginine, methionine, histidine, glutamic acid, aspartic acid, and so forth.

Several modifications of the basic pattern, all within the scope of this invention are set forth below by way of illustration but not limitation.

MODIFICATION A

In this process a solution containing at least one of the group purine bases, pyrimidine bases, nucleosides, and amino acids and also various impurities is contacted with an anion exchanger in the base form. The anion exchanger is then washed with water to remove materials not actually adsorbed on the exchanger but only mechanically held in the mass. The wash water will contain such impurities as sugars and other neutral organic compounds and inorganic cations such as $Na^+$, $K^+$ and so forth. The anion exchanger is then eluted with water saturated with carbon dioxide. The eluate will contain the purine bases, pyrimidine bases, nucleosides, and amino acids. Remaining on the exchanger will be such impurities as non-amino carboxylic acids, inorganic anions, colored principles, and the like. The non-amino carboxylic acids can be recovered from the anion exchanger by elution with a strong acid such as aqueous hydrochloric acid. The procedure of this modification is depicted in the flow sheet of FIG. 1 of the annexed drawing.

A typical application of this procedure is illustrated in the following example:

*Example A–I*

The starting material is a solution containing in 50 cc. of water the following ingredients:

| | Mg. |
|---|---|
| Sucrose | 10 |
| Sodium chloride | 10 |
| Lactic acid (a non-amino carboxylic acid) | 10 |
| Hypoxanthine (a purine base) | 5 |
| Uracil (a pyrimidine base) | 5 |
| Alanine (an amino acid) | 10 |

The solution is poured onto a column of a strongly-basic anion exchanger in the hydroxide form. The column is washed with 50 cc. of water. Essentially all the sugar and sodium ions appear in the wash water passing through the column.

The column is then eluted with water saturated at room temperature with carbon dioxide. The elution is conducted continuously and the eluate is collected in 10 cc. batches in separate test tubes. The tubes are tested from time to time to determine their contents. It is found that the eluate collected in tubes 20 to 30 inclusive contain essentially all the uracil, hypoxanthine, and alanine originally present and this eluate does not contain any lactic acid nor any chloride ions.

The lactic acid remaining on the column is then recovered by eluting with 1 N hydrochloric acid.

The procedure outlined above can be generally applied to those compositions containing at least one member of the group: purine bases, pyrimidine bases, nucleosides, and amino acids in admixture with various impurities. Examples of specific compounds within these groups are:

Purine bases: adenine, guanine, hypoxanthine, caffeine, theobromine, paraxanthine, 2,6-diaminopurine, etc.

Pyrimidine bases: cytosine, divicine, 5-methyl cytosine, 2-amino-4-methyl pyrimidine, uracil, thymine, 6-methyluracil, 6-aminouracil, 4,6-dihydroxypyrimidine, 5-aminouracil, etc.

Nucleosides: adenosine, xanthosine, inosine, guanosine, cytidine, uradine, thymidine, etc.

Amino acids: glycine, alanine, valine, leucine, phenyl alanine, tyrosine, tryptophane, lysine, arginine, histidine, etc.

As noted briefly above, in certain cases, depending on the nature of the nitrogenous components, the pattern of fractionation will vary somewhat from the general pattern. This situation is explained further below:

In cases where the original mixture contains an amino acid of the acidic type, that is, one in which the acidic properties outweigh the basic properties, such amino acid will not be eluated by the $CO_2$-water but will remain adsorbed on the anion exchanger. For example, if in the above example (Example A–I) the original mixture contained glutamic acid, this acid would remain on the anion exchanger after the $CO_2$-water elution and would appear together with the lactic acid in the final elution with hydrochloric acid. Also included in this category of acidic amino acids is aspartic acid. The amino acids of the neutral or basic types will not remain adsorbed on the anion exchanger but will be eluated by the carbon dioxide solution. Examples of such amino acids are glycine, alanine, valine, leucine, phenyl alanine, tyrosine, tryptophane, lysine, arginine, histidine, etc.

In such instance where the acidic amino acid remains adsorbed on the anion exchanger, it can easily be separated by applying further ion exchange techniques. For instance, if in the procedure of Example A–I, the original mixture contained glutamic acid this amino acid would remain on the anion exchanger after elution with $CO_2$-water but would appear together with lactic acid in the final hydrochloric acid eluate. This eluate would then be contacted with a cation exchanger in the hydrogen form. Lactic acid would not be adsorbed by the cation exchanger but would be removed by washing with water. Glutamic acid would be adsorbed by the cation exchanger and would be recovered therefrom by eluting with a solution of ammonium hydroxide.

Another exception is that if the original mixture has in it a purine containing a carboxyl group, a pyrimidine containing a carboxyl group, or the nucleosides of such purines or pyrimidines, then these will not be eluated by the $CO_2$-water but will remain adsorbed on the anion exchanger. Such purines, pyrimidines, or their nucleosides can be recovered from the ion exchanger by eluting with a strong acid such as hydrochloric acid. Examples of compounds in this category are orotic acid and orotidine.

The fact that these nitrogenous components of an acidic nature do not follow the general pattern affords a means by which these components may be separated from the others, that is, those of a neutral to basic nature which follow the general pattern. Methods of doing so are illustrated below:

*Example A–II*

The starting material is a solution containing, in 50 cc. of water, the following ingredients:

| | Mg. |
|---|---|
| Sucrose | 10 |
| Sodium chloride | 10 |
| Glutamic acid (an acidic amino acid) | 10 |
| Alanine (a neutral amino acid) | 10 |

The solution is poured onto a column of a strongly-basic anion exchanger in the hydroxide form. The column is washed with water whereby the non-adsorbed sugar and sodium ions are removed. The column is then eluted with about 200 cc. of water saturated with carbon dioxide whereby the alanine is obtained in the eluate. The column is then eluted with dilute hydrochloric acid whereby the glutamic acid is obtained in this eluate.

*Example A–III*

The starting material is a solution containing in 50 cc. of water the following ingredients:

| | Mg. |
|---|---|
| Orotic acid (a carboxylic pyrimidine) | 5 |
| Uracil (a non-carboxylic pyrimidine) | 5 |

The solution is poured onto a column of a strongly-basic anion exchanger in the hydroxide form. The column is eluted with about 200 cc. of water saturated with carbon dioxide whereby uracil is obtained in the eluate. The column is then washed with 1 N hydrochloric acid whereby orotic acid is obtained in this eluate.

MODIFICATION B

In this modification of the invention, the mixture to be resolved is contacted with an anion exchanger which has been previously saturated with carbon dioxide. That is, water saturated with carbon dioxide is previously run through the anion exchanger until it will absorb no more carbon dioxide. The mixture is then put on the anion exchanger and the exchanger is then eluted with water saturated with carbon dioxide. It has been observed that by such technique the amino acids can be separated from the other nitrogenous components (purine bases, pyrimidine bases and nucleosides) because the amino acids are eluted before these other components. Thus the first portions of the eluate contain the amino acids whereas the purine bases, pyrimidine bases, and nucleosides will appear only in later portions of the eluate.

A distinct advantage of this plan of operation is that the elution automatically regenerates the anion exchanger and puts it into condition for treatment of the next batch of material. No separate regeneration step is needed therefore.

Preferably the procedure of this modification is applied to a material which has already been partly purified, for example, by the anion exchanger treatment described in modification A or the cation exchange treatment described in modification C. The point is that a water washing treatment cannot successfully be used in this technique and as a result if the mixture applied to the anion exchanger contains impurities such as sugars, inorganic salts, etc., these impurities will appear in the eluate with the desired nitrogenous components. It is therefore the preferred practice to first remove these impurities by the anion treatment of modification A, by the cation treatment of modification C, or by other means. This point is further illustrated as follows:

Where the process of this modification is applied to the mixture containing various impurities such as sugars, inorganic salts, inorganic acids, non-amino carboxylic acids, salts of non-amino carboxylic acids, etc., the separation achieved will be as tabulated below:

(1) Present in the $CO_2$-water eluate: (a) The first portions of the eluate will contain the sugars and other neutral organic compounds; salts of non-amino carboxylic acids, such as sodium lactate, potassium citrate, etc.; inorganic salts such as NaCl, KCl, etc.; and the amino acids. (b) The subsequent portions of the eluate will contain the purine bases, pyrimidine bases, and nucleosides.

(2) Remaining on the column after elution with $CO_2$-water: Non-amino carboxylic acids, such as formic, lactic, acetic, oxalic, succinic, etc. and inorganic acids such as hydrochloric, sulphuric, phosphoric, etc.

It is to be noted that in this mode of operation where the mixture contains salts of inorganic acids or salts of non-amino carboxylic acids, these compounds will pass through the anion exchanger and will appear as such in the first portions of the eluate. On the other hand, where the mixture contains inorganic acids or non-amino carboxylic acids, present as such acids, rather than as salts, these acids will be adsorbed on the column and will remain on it even after elution with the $CO_2$-water solution.

In the event that the original mixture is first at least partially purified so that it contains essentially only purine bases, pyrimidine bases, nucleosides, and amino acids, a separation is achieved as follows:

(1) Present in $CO_2$-water eluate: The first portions of the eluate will contain the amino acids; the subsequent portions of the eluate will contain the purine bases, pyrimidine bases, and nucleosides.

(2) Remaining on the anion exchanger: Nothing. The eluted exchanger is thus completely cleared and regenerated and is ready for treatment of the next batch of material.

The procedure of this modification is depicted in the flow sheet of FIG. 2 of the annexed drawing.

Illustrative applications of this modification are as follows:

Example B–I

The starting material is a solution containing, in 50 cc. of water, the following ingredients:

| | Mg. |
|---|---|
| Adenine | 1° |
| Alanine | 1° |

The solution is poured onto a column of a strongly-basic anion exchanger previously treated to saturation with aqueous carbon dioxide. The column is eluted with water saturated with carbon dioxide. The effluent is collected in 10 cc. batches in separate tubes. It is observed that the alanine is present in tubes 4 to 10, the concentration of alanine being at a maximum in tube 6. The adenine is present in tubes 20 to 80, the concentration of adenine being at a maximum in tube 40. After this elution is complete, the column is ready for separation of another lot of purine-amino acid or similar mixture.

The procedure described and illustrated above may be generally applied to separate amino acids from their admixture with components of the group-purine bases, pyrimidine bases, and nucleosides. Examples of specific compounds in these groups are:

Purine bases: adenine, guanine, hypoxanthine, caffeine, theobromine, paraxanthine, theophylline, 2-aminouric acid, 2-6-diaminopurine, etc.

Pyrimidine bases: cytosine, divicine, 5-methyl cytosine, 2-amino-4-methyl pyrimidine, uracil, thymine, 6-methyl uracil, 6-aminouracil, 4,6-dihydroxypyrimidine, 5-aminouracil, etc.

Nucleosides: adenine, xanthosine, inosine, guanosine, cytidine, uridine, thymidine, etc.

Amino acids: glycine, alanine, valine, leucine, phenyl alanine, tyrosine, tryptophane, lysine, arginine, histidine, etc.

In certain cases the pattern of fractionation will not follow the general pattern. Thus in this procedure, where the mixture being treated contains an acidic amino acid (such as glutamic or aspartic) such amino acid will not be eluted by the $CO_2$-water but will remain adsorbed on the anion exchange. Such compounds can subsequently be recovered by elution with a solution of a strong acid such as hydrochloric. Likewise purine bases or pyrimidine bases which contain carboxyl groups or the nucleosides of these will not be eluted by the $CO_2$-water but will remain adsorbed on the anion exchanger. Such compounds, examples of which are orotic acid orotidine, can subsequently be recovered by elution with a strong acid such as hydrochloric.

The exceptional behavior of the nitrogenous components of an acidic nature can be utilized as a tool to effect separation of such components from others which follow the general pattern, that is, those which have a neutral to basic nature. This technique is illustrated below.

Example B–II

The starting material is a solution containing in 50 cc. of water, the following ingredients:

| | Mg. |
|---|---|
| Aspartic acid (an acidic amino acid) | 5 |
| Glycine (a neutral amino acid) | 5 |
| Adenine | 5 |

The solution is poured onto a column of a strongly-basic anion exchanger previously saturated with carbon dioxide. The column is then eluted with water saturated with carbon dioxide. Essentially all the glycine appears in the first 100 cc. of eluate and essentially all the adenine is recovered in the subsequent 500 cc. of eluate. The column is then washed with 1 N hydrochloric acid whereby to recover the aspartic acid in this eluate.

MODIFICATION C

In this process, the initial mixture is subjected to treatment with a cation exchanger. The resulting purified material may then be subjected to treatment with an anion exchanger using the plan of modification A or B. Thus the anion exchanger may be in the hydroxide form (modification A) or in the carbon dioxide saturated form (modification B).

The treatment with the cation exchanger has the advantage that various impurities are removed from the mixture, such impurities including inorganic salts, non-amino carboxylic acids and neutral organic compounds such as sugars.

The mixture to be treated in accordance with this modification may contain any of the purine bases, pyrimidine bases, nucleosides, or amino acids together with various impurities such as non-amino carboxylic acids, neutral organic compounds, inorganic salts, colored principles, and so forth.

Application of the process of this modification entails first contacting the mixture with a cation exchanger in the hydrogen form. The cation exchanger is then washed with water to remove materials not actually adsorbed on the exchanger but only mechanically held in the mass. The wash water will contain such impurities as inorganic anions (chloride, sulphate, etc.); non-amino carboxylic acids (lactic, oxalic, succinic, citric, etc.); and neutral organic compounds as for example sugars. The cation exchanger is then eluted with an aqueous solution of ammonium hydroxide. The eluate contains the purine bases, pyrimidine bases, nucleosides, and amino acids. Remaining adsorbed on the cation exchanger are such impurities as inorganic cations (potassium, sodium, etc.) and colored principles.

The ammonium hydroxide eluate is then heated to evaporate the ammonia therefrom. The resulting solution may then be treated with an anion exchanger by the previously described methods.

The net result of the cation exchange treatment is as follows:

(1) Present in the solution which passes through the cation exchanger or present in the wash water: Sugars and other neutral organic compounds; chlorides, sulphates, or other inorganic anions and non-amino carboxylic acids such as formic, acetic, succinic, oxalic, lactic, citric, etc. as may be present in the original mixture. If large amounts of inorganic salts (KCl, NaCl, etc.) are present in the original mixture these will appear as such in the wash water.

(2) Present in the ammonium hydroxide eluate: Purine bases, pyrimidine bases, nucleosides, and amino acids.

(3) Remaining adsorbed on the cation exchanger after elution with ammonium hydroxide solution: Inorganic cations such as sodium and potassium, colored principles, and so forth.

The procedure of this modification is further illustrated in the flow sheet diagram of FIG. 3 of the annexed drawing.

It is a feature of the cation exchange treatment that the eluting agent contain only water and ammonium hydroxide. As a result the desired nitrogenous compounds are obtained in an eluate containing ammonium hydroxide as the only contaminant. This ammonium hydroxide can be readily removed by application of a moderate amount of heat leaving the desired compounds in solution. Consequently, the isolation of the nitrogenous compounds is not impeded by the presence of any undesired compound as would be the case if the eluting solution contained a non-volatile material or one volatile only by the application of an amount of high degree of temperature in which case the nitrogenous compounds would be exposed to danger of decomposition.

The above explanation illustrates the results that are generally achieved. However in certain cases, depending on the chemical nature of the particular purines, pyrimidines, nucleosides, or amino acids, certain variations will occur. That is, some of these nitrogenous components will be contained in the fractions other than the ammonium hydroxide eluate. These exceptions are discussed and explained hereinafter.

The following example illustrates typical application of the plan of this modification of the invention.

Example C–I

The starting material is a solution containing, in 50 cc. water, the following ingredients:

|   | Mg. |
|---|---|
| Sucrose | 10 |
| Potassium chloride | 10 |
| Lactic acid | 10 |
| Hypoxanthine (a purine) | 5 |
| Glutamic acid (an acid amino acid) | 5 |
| Alanine (a neutral amino acid) | 5 |

The solution is poured onto a column of a strongly-acidic cation exchanger in the hydrogen form. The column is washed with water. Essentially all the sugar, lactic acid, and the chloride ions appear in the wash water.

The column is then eluted with 2% aqueous ammonium hydroxide solution. The eluate contains essentially all of the hypoxanthine, glutamic acid, and alanine together with a minor amount of potassium ions. Most of the potassium ions remain adsorbed on the cation exchanger.

The ammonium hydroxide eluate is warmed on a steam bath until the ammonia is evaporated. The resulting solution of hypoxanthine, glutamic acid and alanine is resolved as follows:

The solution is poured onto a column of a strongly-basic anion exchanger which has been previously saturated with aqueous carbon dioxide. The column is eluted with water saturated with carbon dioxide. The first runnings of the eluate contain all the alanine; later runnings of eluate contain all the hypoxanthine. The glutamic acid remains on the anion exchanger and may be eluted with aqueous hydrochloric acid.

The procedure described above may be generally applied to those compositions containing one or more members of the group—purine bases, pyrimidine bases, nucleosides, and amino acids in admixture with various impurities. Examples of specific compounds within these groups are:

Purine bases: adenine, guanine, hypoxanthine, caffeine, theobromine, paraxanthine, theophylline, 2 - aminouric acid, 2,6-diaminopurine, etc.

Pyrimidine bases: cytosine, divicine, 5-methyl cytosine, 2-amino-4-methyl pyrimidine, 6-aminouracil, 5-aminouracil, etc.

Nucleosides: adenine, xanthosine, inosine, guanosine, cytidine, etc.

Amino acids: glycine, alanine, valine, leucine, phenyl alanine, tyrosine, tryptophane, lysine, arginine, histidine, glutamic acid, aspartic acid, etc.

As noted briefly above, in certain cases, depending on the nature of the nitrogenous components, the pattern of fractionation in the cation exchange treatment will vary somewhat from the general pattern. This situation is explained as follows:

In cases where the original mixture contains a purine containing a carboxyl group, a pyrimidine containing a carboxyl group, or their respective nucleosides, these compounds will not be adsorbed by the cation exchanger but will appear in the water effluent when the cation exchanger is washed with water. Included in this category are such compounds as orotic acid and orotidine. For instance, if in the above example (Example C–I) the original mixture contained orotic acid, this compound would appear in the wash water effluent together with sugar, lactic acid, and chloride ions. Also included in this category of compounds which are not adsorbed by the cation exchanger are purines, pyrimidines, or their respective nucleosides which exhibit acidic properties even though they do not contain carboxyl groups. Specific examples of such compounds are uracil, uridine, thymine, thymidine, 4,6-dihydroxypyrimidine and 6-methyluracil.

The exceptions noted above may be utilized for the separation of the compounds of an acidic nature from the compounds which follow the general pattern, that is, those of a neutral to basic nature. Such a procedure is illustrated below:

Example C–II

The starting material is a solution containing in 50 cc. of water, the following ingredients:

|   | Mg. |
|---|---|
| Inosine | .5 |
| Guanosine | .5 |
| Adenosine | .5 |
| Xanthosine | .5 |
| Uridine | .5 |

The solution is poured onto a column of a strongly-acidic cation exchanger in the hydrogen form. The column is then washed with water. The aqueous effluent contains essentially all the uridine. The column is then eluated with 2% aqueous ammonium hydroxide; the eluate contains the other nucleosides (isosine, guanosine, adenoside, and xanthosine).

Example C–III 1000 grams of beet molasses is agitated with 1000 grams of activated carbon. This mixture is washed with water to remove most of the sugar, then extracted with concentrated ammonium hydroxide (40 liters) to obtain an extract containing various nitrogenous bases originally present in the molasses. The solution is heated on the steam bath to evaporate the ammonia therefrom.

The resulting solution (5 liters) is poured onto a column of a strongly-acidic cation exchanger in the hydrogen form. The exchanger is washed with water. The wash water effluent is collected. It contains uracil and uridine in addition to other nitrogenous bases and other impurities.

This effluent is then poured onto a column of strongly-basic anion exchanger in the hydroxide form. The column is washed with water then eluated with aqueous carbon dioxide solution. The eluate is found to contain uracil and uridine.

MODIFICATION D

Another modification of the invention is concerned with the conversion of the salts of purine bases, pyrimidine bases, nucleosides, or amino acids into the corresponding free bases. Illustrative examples are the conversion of adenine hydrochloride or adenine sulphate into free adenine, the conversion of glycine hydrochloride or sulphate into free glycine, and so forth.

Such a conversion from the salt form into the free base may be an incident to a purification treatment, for instance, where the nitrogenous compounds are precipitated as the hydrochlorides by concentration of a biological source solution followed by addition of hydrochloric acid. Previous methods for preparing the free bases from their salts are in general cumbersome and unsatisfactory.

The procedure in accordance with this invention involves adsorbing the salt on an anion exchanger in the hydroxide form and then selectively eluting the base with an aqueous solution of carbon dioxide. The net effect of the adsorption and elution is that a separation is made of the original cation and anion moieties of the original salt. The eluate may be subjected to concentration to obtain the solid free base or it may be treated with another acid to obtain a salt different from the original one.

A feature of the invention is that the eluate containing the free bases contains only volatile materials—water and $CO_2$. Both of these are easily removed by evaporation without decomposition of the base. The recovery of the free base is not impeded by the presence of non-volatile components as is the case in prior art methods. Another advantage is that neither the salt nor the free base come into contact with strong acids or alkalis and thus the possibility of decomposition by hydrolysis or the like is completely avoided. A further advantage is that if there is an excess of acid admixed with the salt, this excess acid together with the portion of the acid derived from the salt will be adsorbed on the exchanger. For example, if a mixture of alanine hydrochloride and hydrochloric acid is subjected to the process of this modification, alanine will be obtained in the $CO_2$-water eluate whereas remaining on the exchanger will be the hydrochloric acid derived both from the salt and from the excess acid admixed with the salt. The same proposition holds where the excess acid is different from the acid combined in the salt, e.g., where the initial mixture contains alanine hydrochloride and sulphuric acid; alanine sulphate and hydrochloric acid; or other salt of a relatively strong acid with a purine, pyrimidine, nucleoside or amino acid together with an excess of such acid.

This modification is further illustrated as follows:

Example D–I

Ten milligrams of the hydrochloride of 2-amino-4-methyl-pyrimidine is dissolved in 1 cc. of water. This solution is poured onto a column containing 10 cc. of a strongly-basic anion exchanger in the hydroxide form. The column is then eluted with water saturated with carbon dioxide. The resulting eluate containing the free base 2-amino-4-methyl pyrimidine is evaporated on a steam bath to recover the base in solid form.

Example D–II

The procedure as described in Example D–I is repeated using different salts under the same conditions. The salts used are:

Adenine hydrochloride
Tyrosine hydrochloride
Alanine hydrochloride
Lysine hydrochloride In each case the free base is obtained in the $CO_2$-water eluate.

The procedure disclosed above can be generally applied to produce the free base form of purine bases, pyrimidine bases, nucleosides, and amino acids from their salts with acids which are substantially stronger than carbonic acid. Thus the free bases may be produced from salts in which the bases are combined with such acids, as for example, acetic, benzoic, chloroacetic, citric, dichloroacetic, formic, lactic, maleic, oxalic, hydrobromic, phosphoric, sulphuric, picric, sulphurous, and so forth. The base (cation) portion of the salts may be any of the purine bases, pyrimidine bases, nucleosides or amino acids which are described herein as following the general pattern of isolation by the techniques of modification A or B. Illustrative samples are:

Purine bases: adenine, guanine, hypoxanthine, caffeine, theobromine, paraxanthine, theophylline, 2-aminouric acid, 2,6-diaminopurine, etc.

Pyrimidine bases: cytosine, divicine, 5-methyl cytosine, 2-amino-4-methyl pyrimidine, 2,4,6-triaminopyrimidine, 2,4,5,6-tetraamino pyrimidine, 4-amino-2,6-dihydroxy-pyrimidine, etc.

Nucleosides: adenosine, xanthosine, inosine, guanosine, cytidine, uridine, thymidine, etc.

Amino acids: glycine, alanine, valine, leucine, phenyl alanine, tyrosine, tryptophane, lysine, arginine, histidine, etc.

The process of this modification does not operate in the general manner with salts of acidic amino acids, such as glutamic or aspartic acids, as these compounds will not be eluted by the $CO_2$-water solution as explained hereinabove in connection with modification A. However, the procedure may be applied to mixtures of salts of two or more amino acids in which case one will attain the dual result of (1) preparation of the free bases from the salts and (2) separation of the components into two fractions—the ones of a neutral to basic nature which are eluted by the $CO_2$-water solution and the others of an acidic nature which remain adsorbed on the anion exchanger. Such a procedure is illustrated in the example below. It is observed that purine bases, pyrimidine bases and nucleosides which exhibit acidic properties do not form salts with acids. Examples of such compounds are uracil, uridine, thymine, thymidine, orotic acid, orotidine, 4,6-dihydroxy pyrimidine, etc. If these compounds are present in the mixture being subjected to the treatment of this modification, those with carboxyl groups (orotic acid, orotidine) will remain adsorbed on the exchanger and will not be eluted by the $CO_2$-water solution; those which are of an acidic nature but which do not have carboxyl groups (uracil, thymine, 4,6-dihydroxypyrimidine, uridine, thymidine, etc.) will be eluted with the $CO_2$-water solution and thus appear in the eluate.

Example D–III

The starting material is a solution containing, in 50 cc. of water, the following ingredients:

|  | Mg. |
|---|---|
| Glutamic acid hydrochloride | 10 |
| Adenine hydrochloride | 10 |

The solution is poured onto a column of a strongly-basic anion exchanger in the hydroxide form. The exchanger is then eluted with water saturated with carbon dioxide. The eluate contains free adenine. The glutamic acid can be recovered from the exchanger by elution with hydrochloric acid. There is thus achieved the preparation of adenine as the free base and its separation from the glutamic acid.

It is to be noted that in the procedure of this modification the anion exchanger is initially in the hydroxide form and the exchanger may be washed with water after placing the salt or salts on it but prior to elution with the $CO_2$-water. By such washing, impurities not adsorbed by the anion exchanger may be removed so that a purification will thus be achieved. The impurities so removable by washing may be for example sugar and other neutral organic compounds, inorganic cations, and so forth.

This application is a division of Ser. No. 522,885, filed July 18, 1955, now Patent No. 2,891,945.

Having thus described the invention, what is claimed is:

1. The process which comprises applying to a strongly-acidic cation exchanger in the hydrogen form an impure solution containing at least one nitrogenous organic compound of the group consisting of purine bases, pyrimidine bases, nucleosides, and amino acids, thereafter eluting the cation exchanger with aqueous ammonium hydroxide, collecting the eluate being a purified solution containing at least one member of the aforesaid group, evaporating ammonia from the eluate, applying the resulting solution to a strongly-basic anion exchanger, eluting the anion exchanger with an aqueous solution of carbon dioxide, and recovering the eluate being a further purified solution containing at least one member of the aforesaid group.

2. The process of claim 1 wherein said impure solution is a plant extract.

3. The process of claim 1 wherein the said impure solution is an extract of sugar beets and wherein the anion exchanger is in the hydroxide form prior to application of the de-ammoniated solution.

References Cited in the file of this patent

UNITED STATES PATENTS 2,387,824     Block _____ Oct. 30, 1945

OTHER REFERENCES

Block: Archives of Biochem. 11; 235–248 (1946).
Winters: Ind. and Eng. Chem., March 1949, pp. 460–3.
Cohn: Science, 109, April 1949, pp. 377–8.
Kunin: Ion Exchange Resins, 1950, pp. 120, 122, 123, 132–135, John Wiley & Sons, N.Y.C.